US011159054B2

(12) United States Patent
Pinciuc et al.

(10) Patent No.: US 11,159,054 B2
(45) Date of Patent: Oct. 26, 2021

(54) WIRELESS POWER TRANSMITTING DEVICES

(71) Applicant: Apple Inc., Cupertino, CA (US)

(72) Inventors: Christopher M. Pinciuc, Cupertino, CA (US); Dmitry Berdnikov, San Jose, CA (US); Jukka-pekka J. Sjoeroos, Cupertino, CA (US); Sumant Ranganathan, Saratoga, CA (US); Weihong Qiu, San Ramon, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 16/513,583

(22) Filed: Jul. 16, 2019

(65) Prior Publication Data

US 2020/0036229 A1 Jan. 30, 2020

Related U.S. Application Data

(60) Provisional application No. 62/702,709, filed on Jul. 24, 2018.

(51) Int. Cl.
*H02J 50/40* (2016.01)
*H02J 50/12* (2016.01)
(Continued)

(52) U.S. Cl.
CPC .............. *H02J 50/12* (2016.02); *H01F 38/14* (2013.01); *H02J 7/025* (2013.01); *H02J 50/40* (2016.02); *H02J 50/90* (2016.02); *H02J 50/60* (2016.02)

(58) Field of Classification Search
CPC .. H02J 50/12; H02J 7/025; H02J 50/90; H02J 50/40; H02J 50/60; H02J 7/007;
(Continued)

(56) References Cited

U.S. PATENT DOCUMENTS 8,916,994 B2  12/2014  Jung et al.
9,360,456 B2   6/2016  Miyamoto
(Continued)

FOREIGN PATENT DOCUMENTS

CN   102570630 A   7/2012
CN   102882283 A   1/2013
(Continued)

*Primary Examiner* — Nghia M Doan
(74) *Attorney, Agent, or Firm* — Treyz Law Group, P.C.; Jason Tsai

(57) ABSTRACT

A power system has a wireless power transmitting device and a wireless power receiving device. Coils in the transmitting device may include a circular coil overlapped by first and second rectangular coils at a charging surface. The rectangular coils each include straight segments extending over a central region of the circular coil. Control circuitry can activate the circular coil to transmit wireless power to a first type of wireless power receiving coil using vertical components of the magnetic field generated by the circular coil. The control circuitry can activate the rectangular coils to transmit wireless power to a second type of wireless power receiving coil using horizontal components of the magnetic field generated by the rectangular coils. The circular and rectangular coils wirelessly charge the power receiving device while located at the same position on the charging surface, regardless of the type of wireless power receiving coil that is used.

22 Claims, 9 Drawing Sheets

(51) Int. Cl.
*H02J 7/02* (2016.01)
*H01F 38/14* (2006.01)
*H02J 50/90* (2016.01)
*H02J 50/60* (2016.01)

(58) Field of Classification Search
CPC .......... H02J 50/80; H02J 50/402; H02J 50/10; H01F 38/14
See application file for complete search history.

(56) References Cited

U.S. PATENT DOCUMENTS

| | | | |
|---|---|---|---|
| 9,413,175 B2* | 8/2016 | Park | H02J 50/70 |
| 10,044,229 B2 | 8/2018 | Partovi et al. | |
| 10,186,912 B2 | 1/2019 | Stamenic et al. | |
| 10,305,332 B2 | 5/2019 | Liu et al. | |
| 2011/0181238 A1* | 7/2011 | Soar | H02J 50/12 320/108 |
| 2013/0015719 A1 | 1/2013 | Jung et al. | |
| 2014/0070622 A1 | 3/2014 | Keeling et al. | |
| 2015/0236513 A1 | 8/2015 | Covic et al. | |
| 2015/0365137 A1* | 12/2015 | Miller | H01M 10/425 307/104 |
| 2017/0194809 A1 | 7/2017 | Partovi et al. | |
| 2019/0027966 A1 | 1/2019 | Cho et al. | |

FOREIGN PATENT DOCUMENTS

| | | | |
|---|---|---|---|
| CN | 104319859 A | 1/2015 | |
| CN | 206524686 U | 9/2017 | |
| CN | 107769397 A | 3/2018 | |
| CN | 108109831 A | 6/2018 | |
| KR | 2014-0142139 A | 12/2014 | |
| KR | 2015-0057963 A | 5/2015 | |
| WO | WO-2018034392 A1 * | 2/2018 | H01F 27/38 |

* cited by examiner

WIRELESS POWER TRANSMITTING DEVICES

This application claims the benefit of provisional patent application No. 62/702,709, filed Jul. 24, 2018, which is hereby incorporated by reference herein in its entirety.

FIELD

This relates generally to power systems, and, more particularly, to wireless power systems.

BACKGROUND

Portable electronic devices such as cellular telephones, wristwatch devices, tablet computers, wireless earbuds, and other portable devices use batteries. The batteries in these devices can be charged using a battery charging system. To enhance convenience for users, wireless power systems have been provided that allow batteries in portable electronic devices to be charged wirelessly.

SUMMARY

A power system has a wireless power transmitting device and a wireless power receiving device. Coils in the power transmitting and receiving devices are used to transmit and receive wireless power signals. Good coupling between transmitting and receiving coils promotes wireless power transfer efficiency.

Embodiments of power transmission coils in the power transmitting devices may include a circular coil that is overlapped by first and second rectangular coils at a charging surface. The rectangular coils each include straight vertical segments that extend over a central region of the circular coil that is devoid of conductive material. The rectangular coils each extend across a smaller lateral area of the charging surface than the circular coil.

Control circuitry can selectively activate the circular coil to transmit wireless power to a first type of wireless power receiving coil using vertical components of the magnetic field generated by the circular coil. The control circuitry can selectively activate one or both of the rectangular coils to transmit wireless power to a second type of wireless power receiving coil using horizontal components of the magnetic field generated by the rectangular coils. The circular coil and the rectangular coils wirelessly charge the power receiving device while located at the same position on the charging surface regardless of the type of wireless power receiving coil used on the power receiving device.

In some embodiments, the first and second rectangular coils may overlap each other on the charging surface. The first and second rectangular coils and the circular coil can form a unit cell of wireless power transmitting coils that is repeated across the charging surface.

In some embodiments, two, three, or more than three unit cells of wireless power transmitting coils are distributed across the charging surface. The unit cells can be distributed within a single row extending along a longitudinal axis of the wireless power transmitting device. The straight vertical segments of the rectangular coils are longer than the horizontal segments of the rectangular coils and extend perpendicular to the longitudinal axis of the wireless power transmitting device.

DETAILED DESCRIPTION

Portable electronic devices have batteries. Wired and wireless charging systems may be used in charging the batteries. For example, a user may place devices such as wristwatch devices and cellular telephones on a wireless charging mat to wirelessly charge these devices.

Figure 1:
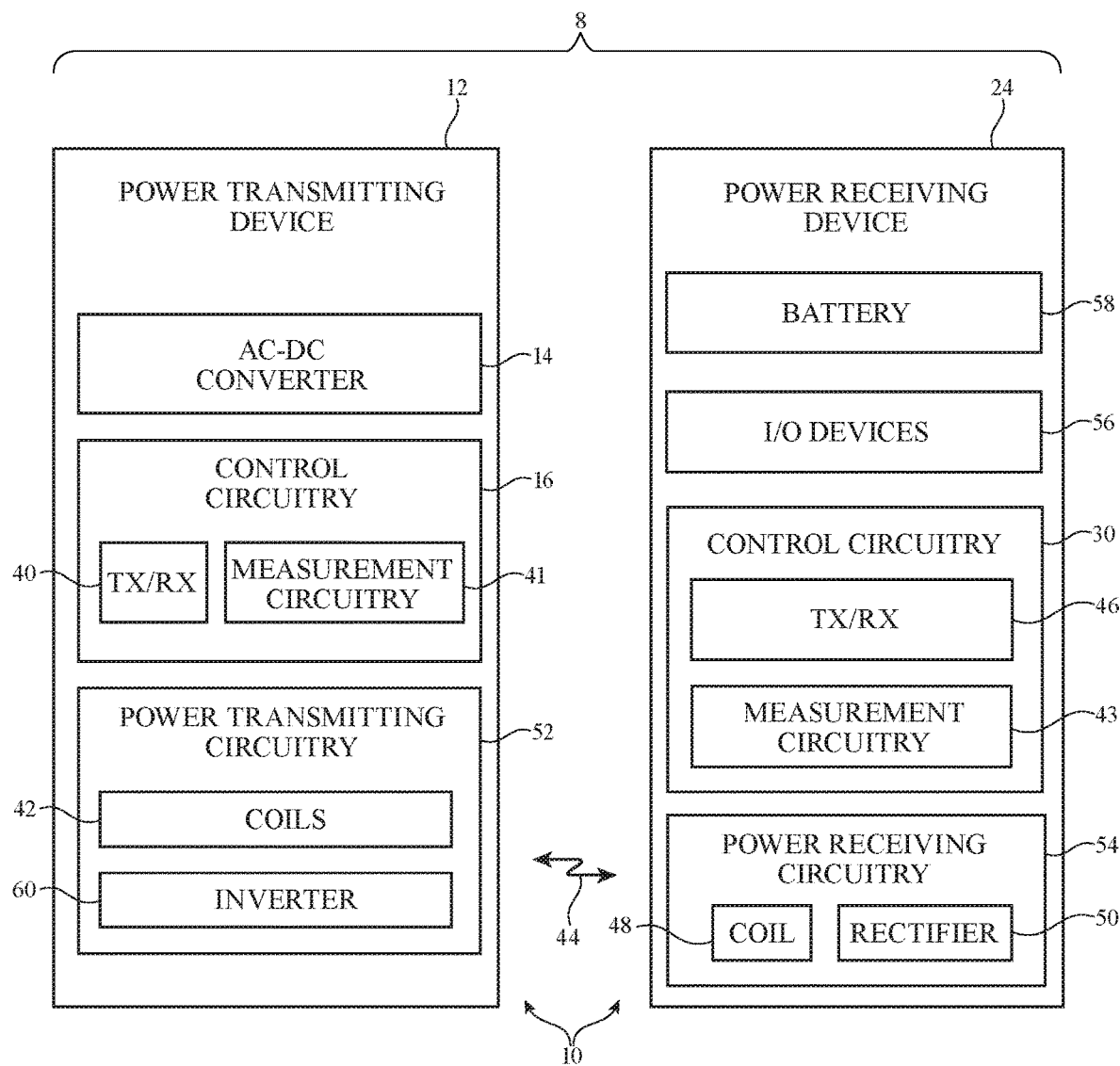
FIG. 1 is a schematic diagram of an illustrative wireless power system in accordance with an embodiment.

An illustrative wireless power system is shown in FIG. 1. Wireless power system 8 (sometimes referred to as a wireless charging system) has wireless power transmitting equipment that is used for supplying wireless power. The wireless power is used for charging batteries in electronic devices and in supplying power to other device components.

As shown in FIG. 1, wireless power system 8 includes electronic devices 10. Electronic devices 10 include electronic devices that provide power (e.g., charging mats, charging pucks, charging stands, tablet computers, and other portable electronic devices with wireless power transmitting capabilities, etc.). Electronic devices 10 also include electronic devices that receive power. These power receiving devices may include, for example, portable electronic devices such as cellular telephones, wireless earbuds, and wristwatch devices (as examples).

Power can be used for powering circuitry in a power receiving device other than a battery and can be used for charging a battery in a power receiving device. Because battery charging is a common use of received power, wireless power transfer operations in system 8 are sometimes referred to as battery charging operations. Power can also be provided to a receiving device to operate a display or other circuitry in the receiving device without battery charging, if desired.

Charging can be performed by transferring power from a power transmitting device such as device 12 to a power receiving device such as device 24. Power may be transferred between device 12 and device 24 wirelessly (e.g., using inductive charging). In the example of FIG. 1, power is being transferred wirelessly using wireless power signals 44.

During operation of system 8, wireless power transmitting device 12 wirelessly transmits power to one or more wireless power receiving devices such as device 24. The wireless power receiving devices may include electronic devices such as wristwatches, cellular telephones, tablet computers, laptop computers, ear buds, battery cases for ear buds and other devices, tablet computer pencils (e.g., styluses) and other input-output devices (e.g., accessory devices), wearable devices, or other electronic equipment. The wireless power transmitting device may be an electronic device such as a wireless charging mat that has a charging surface (e.g., a planar charging surface) that receives portable devices to be charged, a tablet computer or other portable electronic device with wireless power transmitting circuitry (e.g., one of devices 24 that has wireless power transmitting circuitry), or other wireless power transmitting device. The wireless power receiving devices use power from the wireless power transmitting device for powering internal components and for charging internal batteries.

As shown in FIG. 1, wireless power transmitting device 12 includes control circuitry 16. Wireless power receiving device 24 includes control circuitry 30. Control circuitry in system 8 such as control circuitry 16 and control circuitry 30 (and/or control circuitry in other devices 10) is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, adjusting the phases and magnitudes of coil drive signals, determining power transmission levels, processing sensor data and other data, processing user input, handling negotiations between devices 12 and 24, sending and receiving in-band and out-of-band data, making measurements, starting and stopping charging operations, turning devices 10 on and off, placing devices 10 in low-power sleep modes, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of devices 10 (e.g., control circuitry 16 and/or 30). The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable electronic device (cellular telephone, tablet computer, laptop computer, etc.), may be equipment that has been incorporated into furniture, a vehicle, or other system, or may be other wireless power transfer equipment. Illustrative configurations in which wireless power transmitting device 12 is a wireless charging mat or portable electronic device are sometimes described herein as an example.

Power receiving device 24 may be a portable electronic device such as a wristwatch, a cellular telephone, a laptop computer, a tablet computer, an accessory such as an earbud, a tablet computer input device such as a wireless tablet computer pencil, a battery case, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. In some configurations, AC-DC power converter 14 may be provided in an enclosure (e.g., a power brick enclosure) that is separate from the enclosure of device 12 (e.g., a wireless charging mat enclosure or portable electronic device enclosure) and a cable may be used to couple DC power from the power converter to device 12. DC power may be used to power control circuitry 16.

During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat) or may be arranged in other configurations. In some arrangements, device 12 may have only a single coil. In arrangements in which device 12 has multiple coils, the coils may be arranged in one or more layers. Coils in different layers may or may not overlap with each other.

In some configurations, coils 42 are formed from coils that help direct magnetic fields vertically (e.g., parallel to the surface normal of a charging mat). In other configurations, coils 42 may include coils that help direct magnetic fields horizontally (e.g., parallel to the surface of a charging mat). These coils may, for example, generate magnetic fields having substantial horizontal components running parallel to the surface of device 12. If desired, coils 42 may include multiple different types of coils such as both coils that help direct magnetic fields vertically and coils that help direct magnetic fields horizontally. These different types of coils may be formed in different layers and may overlap each other if desired.

Coils 48 in device 24 can also be formed from solenoids. The solenoids in a charging mat may be formed in an array that lies under the charging surface of the charging mat and that extends across the charging surface of the charging mat. In some configurations, coils 42 and/or 48 may be implemented using pot cores formed of magnetic material with circular grooves or grooves of other shapes.

As the AC currents pass through one or more coils 42, a time varying electromagnetic (e.g., magnetic) field (signals 44) is produced that is received by one or more corresponding receiver coils such as coil 48 in power receiving device 24. When the time varying electromagnetic field is received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering (charging) an energy storage device such as battery 58 and can be used in powering other components in device 24. For example, device 24 may include input-output devices 56 such as a display, touch sensor, communications circuits, audio components, sensors, components that produce electromagnetic signals that are sensed by a touch sensor in a tablet computer or other device with a touch sensor (e.g., to provide pencil input, etc.), and other components and these components may be powered by the DC voltages produced by rectifier 50 (and/or DC voltages produced by battery 58 or other energy storage device in device 24).

Device 12 and/or device 24 may communicate wirelessly (e.g., using in-band and out-of-band communications). Device 12 may, for example, have wireless transceiver (TX/RX) circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In some configurations, devices 10 can communicate through local area networks and/or wide area networks (e.g., the internet).

Wireless transceiver circuitry 40 can use one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. Other types of communications (e.g., other types of in-band communications) may be used, if desired.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, less than 500 kHz, less than 300 kHz, less than 150 KHz, between 80 kHz and 150 kHz, or other suitable wireless power frequency. In some configurations, the power transmission frequency may be negotiated in communications between devices 12 and 24. In other configurations, the power transmission frequency may be fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48. Other types of in-band communications between device 12 and device 24 may be used, if desired.

In-band communications between device 24 and device 12 uses ASK modulation and demodulation techniques or other suitable in-band communications techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows a stream of ASK data bits (e.g., a series of ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 42 to determine whether any devices 24 are present on device 12 (e.g., whether devices 24 are suspected to be present on device 12). Measurement circuitry 43 in control circuitry 30 and/or measurement circuitry 41 in control circuitry 16 may also be used in making current and voltage measurements, and/or may be used in making other measurements on wireless power receiving circuitry 54. In scenarios where device 12 includes multiple coils 42, control circuitry 16 can perform measurements using each coil 42 in sequence and/or in parallel. Control circuitry 16 can compare measurements made using measurement circuitry 41 to predetermined characteristics associated with device 24 (e.g., predetermined characteristics associated with different types of devices 24 that control circuitry 16 uses to identify the type of device 24 that is being charged).

Figure 2:
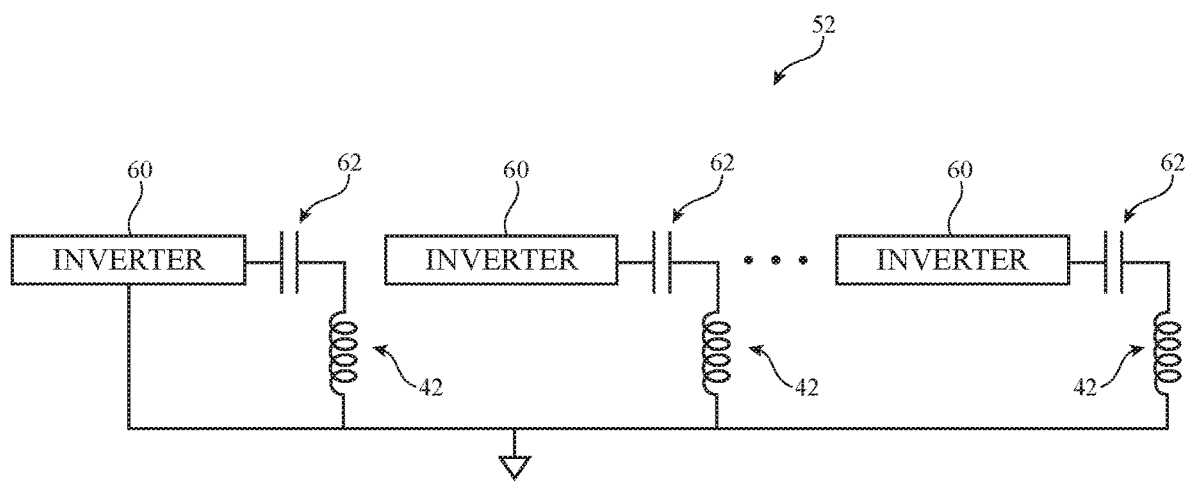
FIG. 2 is a schematic diagram of illustrative wireless power transmitting circuitry in accordance with an embodiment.

Illustrative wireless power transmitting circuitry 52 in a configuration in which wireless power transmitting device 12 has multiple coils 42 is shown in FIG. 2. With the illustrative arrangement of FIG. 2, circuitry 52 has inverter circuitry formed from multiple inverters 60, each controlled by control circuitry 16 and each supplying drive signals to a corresponding wireless power transmitter circuit having a respective coil 42 and capacitance (e.g., capacitor 62). The phase and magnitude of the alternating-current drive signal supplied by each inverter 60 to its associated coil 42 can be adjusted independently by control circuitry 16. As a result, one or more of coils 42 (e.g., coils in a cluster overlapped by coil 48 in device 24) can be activated while remaining coils are not driven and remain inactive. If desired, switching circuitry can be used to decouple inactive coils from the corresponding inverter 60 and/or ground (e.g., inactive coils can be held at a floating potential).

The phase of each active coil 42 can also be varied. For example, one coil may have a first phase and a second coil (e.g., an adjacent coil) may be driven with opposite phase (e.g., the second coil may have a second phase that is 180° out of phase with the first phase). Using arrangements such as these, control circuitry 16 can control the strength and orientation of the magnetic fields produced by coils 42.

Figure 3:
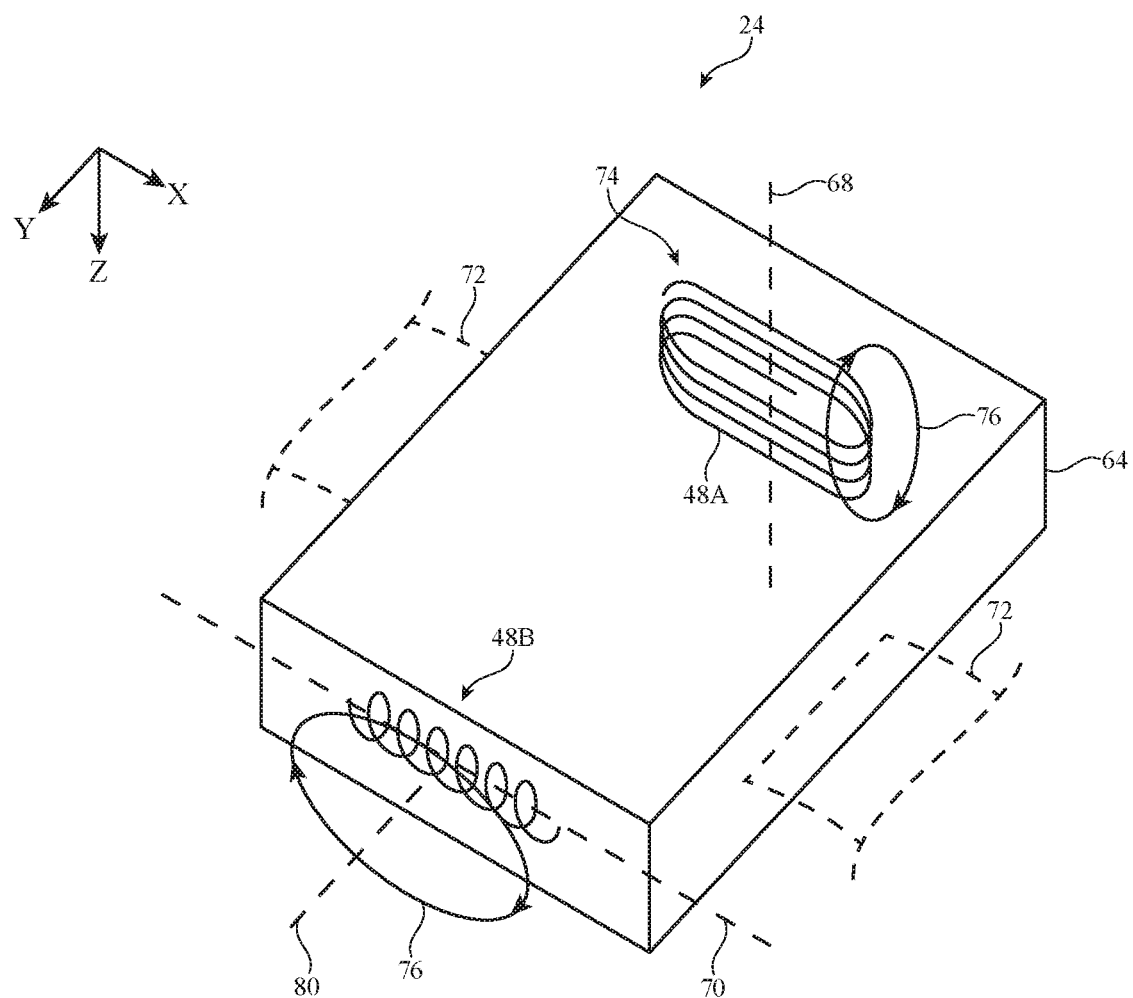
FIG. 3 is a perspective view of an illustrative wireless power receiving device with coils for receiving wireless power in accordance with an embodiment.

FIG. 3 is a rear perspective view of an exemplary wireless power receiving device 24. As shown in FIG. 3, wireless power receiving device 24 includes a housing such as housing 64. Housing 64 has a surface 74 (sometimes referred to herein as rear surface 74) that is placed on or over a charging surface of device 12 for wirelessly charging device 24 (e.g., both rear surface 74 and the charging surface of device 12 lie substantially parallel to the X-Y plane of FIG. 3 during wireless charging). On devices where one surface is substantially defined by a display screen (e.g., OLED display), the rear surface is opposite the surface defined by the display screen.

In some configurations (e.g., in scenarios where device 24 is a wrist watch or other wearable device), device 24 includes a wrist strap 72 coupled to housing 64. In these scenarios, wrist strap 72 may contact the charging surface while device 24 is being wirelessly charged. In practice, wrist strap 72 can serve to hold housing 64 over (and separate from) the charging surface and/or can mechanically bias housing 64 away from the charging surface. Wrist strap 72 can be omitted if desired.

Device 24 includes one or more coils 48 on or within housing 64. Housing 64 can include metal materials, dielectric materials, or combinations of these and/or other materials. A display or other input-output devices can be mounted to housing 64 if desired (e.g., on the side of housing 64 opposite to surface 74). In scenarios where coils 48 are mounted within housing 64, housing 64 can include dielectric portions in the vicinity of the coils to allow external magnetic fields to interact with coils 48.

Coils 48 can be mounted at different possible orientations within device 24. In some scenarios, device 24 includes a vertically-oriented coil such as coil 48A. Coil 48A wraps around a central (longitudinal) axis 68 oriented within a plane normal (perpendicular) to surface 74 (e.g., parallel to the Z-axis of FIG. 3). In other scenarios, device 24 includes a horizontally-oriented coil such as coil 48B. Coil 48B wraps around a central (longitudinal) axis 70 oriented within a plane parallel to surface 74 (e.g., parallel to the X-Y plane of FIG. 3). Central axis 70 of coil 48B is oriented perpendicular to central axis 68 of coil 48A and can extend parallel to a sidewall of housing 64 if desired (e.g., coil 48B has a transverse axis 80 that extends perpendicular to central axis 70 and that can extend parallel to a normal vector of a sidewall of housing 64). Device 24 can include one or more coils 48A and/or one or more coils 48B. Coils such as coils 48A and 48B can be mounted at any desired locations on or within housing 64.

Coil 48A can be confined to a single plane (e.g., a plane parallel to the X-Y plane as shown in the example of FIG. 3) or can extend vertically along central axis 68 (e.g., in a cylindrical shape). Similarly, coil 48B can be confined to a single plane or can extend horizontally along central axis 70 (as shown in the example of FIG. 3). Coil 48A is sometimes referred to herein as vertical coil 48A (e.g., because central axis 68 is oriented vertically with respect to surface 74). Coil 48B is sometimes be referred to herein as horizontal coil 48B (e.g., because central axis 70 is oriented horizontally with respect to surface 74).

Vertical coil 48A includes one or more turns of wire or other conducive structures that wind (wrap) around central axis 68. Coil 48B includes one or more turns of wire or other conductive structures that wind (wrap) around central axis 70. The wire in vertical coil 48A can be wrapped around a central core formed from a magnetic material such as ferrite if desired. Similarly, the wire in vertical coil 48A can be wrapped around a central core formed from magnetic material if desired. Wire in coils 48A and 48B can be formed from solid copper wire or other suitable conductive strands of material.

In some situations, a user may place device 24 on a charging surface of device 12 so that rear surface 74 of housing 64 lies flat on the charging surface. In this configuration (e.g., in scenarios where device 10 includes vertical coil 48A), central axis 68 of coil vertical 48A extends parallel to the central axis of coil(s) 42 in device 12 and magnetic field 76 from coil(s) 42 may pass vertically through coil 48A. The vertical component of magnetic field 76 induces current on coil 48A that is used to wirelessly charge device 24.

In scenarios where device 10 includes horizontal coil 48B, central axis 70 of coil 48B may extend perpendicular to the central axis of coil(s) 42 in device 12 and magnetic field 76 from coil(s) 42 on device 12 may pass laterally (horizontally in the configuration of FIG. 3) through coil 48B. The horizontal component of magnetic field 76 induces current on coil 48B that is used to wirelessly charge device 24.

Some types of devices 24 include vertical coils such as coil 48A of FIG. 3 whereas other types of devices 24 include horizontal coils such as coil 48B of FIG. 3. For example, in scenarios where device 24 is a cellular telephone, device 24 may include only vertical coils such as coil 48A. However, in other scenarios such as scenarios where device 12 includes wrist strap 72 (e.g., in scenarios where device 12 is a wristwatch), strap 72 may extend parallel to surface 74. If strap 72 is an elastomeric loop and has no clasps, it may be impossible for a user to place rear surface 74 of housing 64 directly on the charging surface and strap 72 may hold device 12 in a position that is separated from (e.g., raised slightly above) the charging surface. In these scenarios, vertical coils such as coil 48A may not receive adequate magnetic flux from coil(s) 42 on device 12 to sufficiently charge device 24. However, horizontal coils such as coil 48B can receive enough flux from coil(s) 42 on device 12 to sufficiently charge device 24 in these scenarios. These types of devices (e.g., devices having wrist strap 72) may include only horizontal coils such as coil 48B if desired.

Device 12 is configured to transfer a sufficient amount of wireless power to wirelessly charge device 24 regardless of whether device 24 has vertical or horizontal coils. Device 12 includes different types of coils 42 that are optimized for transferring wireless power to vertical coils or for transferring wireless power to horizontal coils. For example, device 12 can include a first set of coils 42 that are arranged to maximize wireless power transfer for vertical coils 48A and can include a second set of coils 42 that are arranged to maximize wireless power transfer for horizontal coils 48B.

Figure 4:
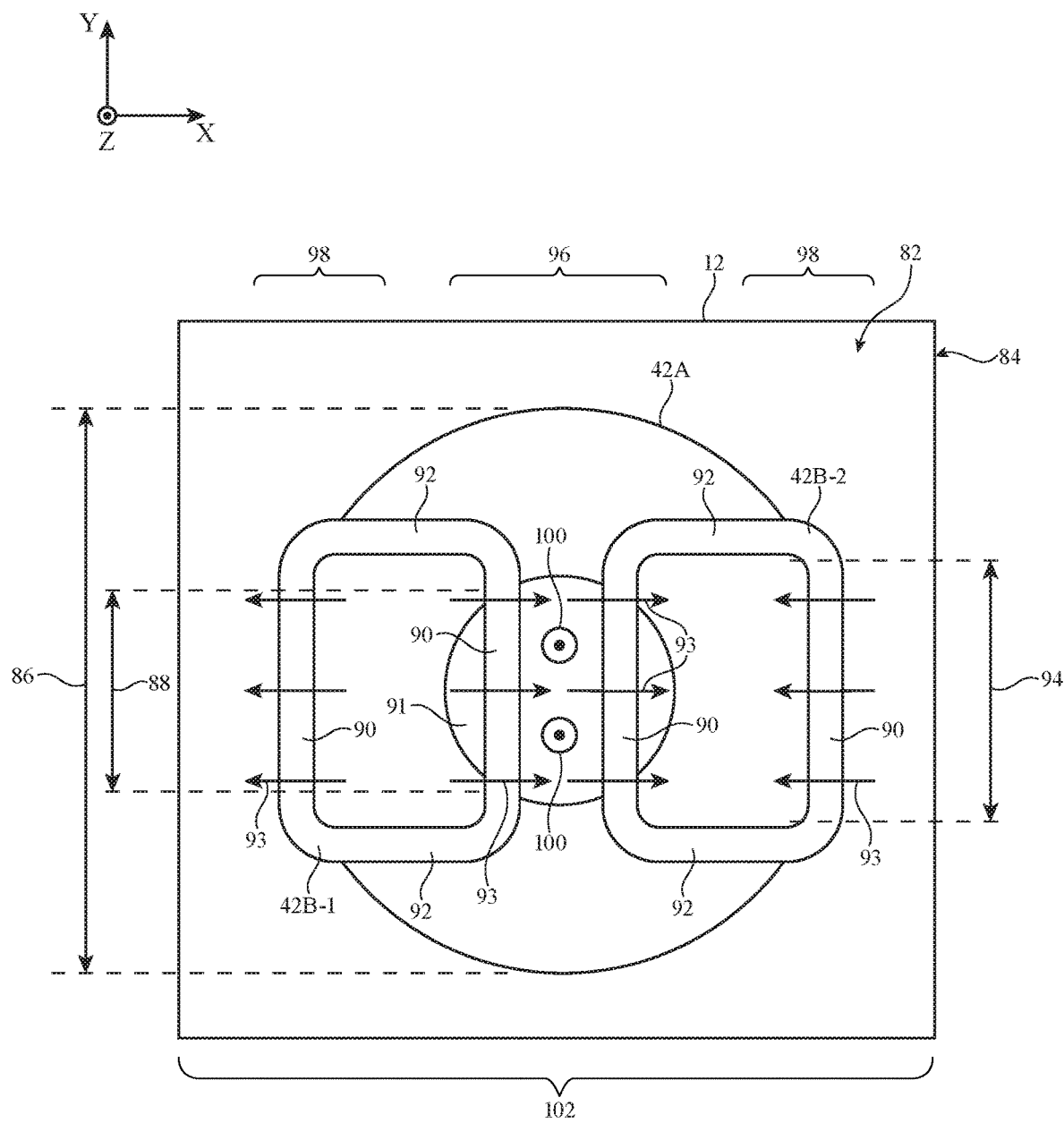
FIG. 4 is a top view of an illustrative wireless power transmitting device having multiple coils for charging different types of wireless power receiving coils in accordance with an embodiment.

FIG. 4 is a top-down view of wireless power transmitting device 12 in an illustrative configuration in which device 12 has different coils 42 at charging surface 82 for transferring wireless power to vertical coils 48A and horizontal coils 48B. The coils 42 in device 12 include a first set of coils 42A that are configured to optimize wireless power transfer to vertical coils 48A and a second set of coils 42B that are configured to optimize wireless power transfer to horizontal coils 48B. In the example of FIG. 4, device 12 includes a first coil 42A for transferring wireless power to vertical coils 48A and a pair of coils 42B (e.g., a first coil 42B-1 and a second coil 42B-2) for transferring wireless power to horizontal coils 48B.

With one illustrative configuration, device 12 is a wireless charging mat (e.g., a wireless charging mat having a planar surface that opposes charging surface 82 and that rests on an underlying surface such as a tabletop or other surface). A user may place device 24 onto charging surface 82 for charging device 24. Rear surface 74 of device 24 (FIG. 3) and charging surface 82 lie within planes that are substantially parallel to the X-Y plane of FIG. 4 during wireless charging.

Coils 42B-1 and 42B-2 are formed over coil 42A in device 12 (e.g., coils 42B-1 and 42B-2 are interposed between coil 42A and device 24 during charging). A ferrite or nanocrystalline layer can be formed under coil 42A if desired. One or more dielectric layers can be used to prevent coils 42B-1 and 42B-2 from shorting to coil 42A if desired.

As shown in FIG. 4, coil 42A is a circular coil extending around a central axis that runs parallel to the Z-axis of FIG. 4. Coil 42A includes a number of windings extending from inner diameter 88 of coil 42A to outer diameter 86 of coil 42A. Inner diameter 88 surrounds a central region 91 of coil 42A that is free from the conductive material (e.g., wire) used to form coil 42A.

Inner diameter 88 and outer diameter 86 are selected to match the size of the vertical coils 48A on device 24 and to thereby optimize wireless power transfer to vertical coils 48A on device 24. As an example, inner diameter 88 may be between 15 mm and 25 mm, between 10 mm and 30 mm, between 5 mm and 35 mm, between 18 mm and 22 mm, greater than 35 mm, less than 5 mm, or other sizes. In one suitable arrangement, inner diameter 88 is approximately 20 mm. Outer diameter 86 may be between 45 mm and 55 mm, between 40 mm and 60 mm, between 35 mm and 65 mm, less than 35 mm, greater than 65 mm, or other sizes greater than inner diameter 88. In one suitable arrangement, outer diameter 86 is approximately 50 mm.

Device 12 drives coil 42A (e.g., using a corresponding inverter 60 of FIG. 2) to produce magnetic field 100. The vertical component of magnetic field 100 passes through vertical coil 48A while device 24 is placed on charging surface 82 and induces current on vertical coil 48A that serves to wirelessly charge device 24 (e.g., as shown by magnetic field 76 of FIG. 3). Electromagnetic coupling between coil 42A and vertical coil 48A is maximal when vertical coil 48A is centered about coil 42A. However, the size of coil 42A allows for some positional tolerance along the X and Y axes of FIG. 4 for the placement of device 24 on charging surface 82 (e.g., device 24 may exhibit sufficient wireless charging efficiency while placed on charging surface 82 within a few millimeters or centimeters about the center of coil 42A).

If desired, device 12 can include alignment structures such as visual markings that indicate the location on charging surface 82 at which the user should place device 24 to maximize wireless power transfer between coil 42A and vertical coil 48A. In another suitable arrangement, device 12 includes magnetic or mechanical alignment structures that serve to hold device 24 in place over the location on charging surface 82 that maximizes wireless power transfer between coil 42A and vertical coil 48A. Device 12 can include both visual and mechanical alignment structures if desired.

In the example of FIG. 4, coils 42B-1 and 42B-2 are rectangular coils having straight horizontal segments 92 (e.g., extending parallel to the X-axis of FIG. 4) and straight vertical segments 90 (e.g., extending parallel to the Y-axis of FIG. 4) that collectively wind around respective central axes parallel to the Z-axis of FIG. 4. Coils 42B-1 and 42B-2 each completely or partially overlap the underlying coil 42A. Coils 42B-1 and 42B-2 each include a corresponding straight vertical segment 90 that overlaps central region 91 of coil 42A (e.g., the portions of coils 42B-1 and 42B-2 overlapping central region 91 are straight and extend parallel to the Y-axis of FIG. 4).

Coils 42B-1 and 42B-2 each have an inner rectangular length 94 that is equal to the length of vertical segments 90 and that is greater than inner diameter 88 of coil 42A. Coils 42B-1 and 42B-2 each have an inner rectangular width that is equal to the length of horizontal segments 92. The length of vertical segments 90 (e.g., length 94) is greater than or equal to the length of horizontal segments 92. Coils 42B-1 and 42B-2 also have rectangular outer dimensions that are defined by the number of coil windings (loops) and the length of segments 90 and 92. The rectangular outer dimensions of coils 42B-1 and 42B-2 are less than outer diameter 86 of coil 42A (e.g., the lengths of segments 92 and 90 are each less than outer diameter 86). In one illustrative arrangement, the number of windings in each of coils 42B-1 and 42B-2 (e.g., the number of rectangular loops of conductor in coils 42B-1 and 42B-2) is less than the number of windings in coil 42A (e.g., the number of circular loops in coil 42A). In general, coils 42B-1 and 42B-2 each extend across a smaller lateral area of charging surface 82 than coil 42A (e.g., coils 42B-1 and 42B-2 are each smaller than coil 42A). The rectangular dimensions and number of windings of coils 42B-1 and 42B-2 are selected to optimize wireless power transfer to horizontal coils 48B on device 24 without significantly blocking or attenuating wireless power transmitted by coil 42A while coil 42A is active.

Device 12 drives one or both of coils 42B-1 and 42B-2 (e.g., using corresponding inverters 60 of FIG. 2) to produce a magnetic field having horizontal components 93 that run perpendicular to vertical segments 90 and parallel to the X-axis of FIG. 4 (e.g., parallel to charging surface 82 and the X-Y plane of FIG. 4). Horizontal components 93 of the magnetic field are generated by vertical segments 90 of coils 42B-1 and 42B-2 and pass through horizontal coil 48B while device 24 is placed on charging surface 82 (e.g., as shown by magnetic field 76 passing through horizontal coil 48B of FIG. 3).

Electromagnetic coupling between coils 42B-1 or 42B-2 and horizontal coil 48B is maximal when horizontal coil 48B is centered over a vertical segment 90 and oriented so that central axis 70 of horizontal coil 48B (FIG. 3) extends substantially parallel to (e.g., within 25 degrees of) horizontal components 93 of the magnetic field generated by coils 42B-1 and 42B-2. In the example of FIG. 4, electromagnetic coupling for horizontal coil 48B is maximal within regions 98 and 96 of charging surface 82. A user may therefore place a device 24 having horizontal coil 48B along the X-axis of FIG. 4 within regions 98 or 96 for wireless charging. The example of FIG. 4 is merely illustrative and, if desired, regions 98 can be continuous with region 96.

If desired, device 12 can concurrently use both coils 42B-1 and 42B-2 to wirelessly charge device 24. In this scenario, device 12 drives coils 42B-1 and 42B-2 with currents that are 180 degrees out of phase with each other (e.g., using respective inverters 60 of FIG. 2). This ensures that horizontal component 93 of the magnetic field generated by the right-most vertical segment 90 of coil 42B-1 adds with (instead of canceling out with) horizontal component 93 of the magnetic field generated by the left-most vertical segment 90 of coil 42B-2. This may also serve to increase wireless power transfer within region 96 (as well as the lateral area that can be used for wireless charging) relative to scenarios where only one of coils 42B-1 and 42B-2 is active at a given time.

In this way, device 12 can transfer wireless power to horizontal coil 48B on device 24 even if device 24 is not placed precisely over the center of coil 42A. In addition, the length 94 of vertical segments 90 is selected to allow device 24 to be placed at different locations along the Y-axis of FIG. 4, while still allowing for satisfactory wireless coupling to horizontal coil 48B on device 24. For example, device 24 can be placed at any desired location along the Y-axis of FIG. 4 so long as horizontal coil 48B overlaps at least one vertical segment 90.

By aligning at least one vertical segment 90 of coils 42B-1 and 42B-2 with central region 91 of the underlying coil 42A, coils 42A, 42B-1, and 42B-2 each exhibit maximum wireless power transfer efficiency within the same lateral region of charging surface 82 (e.g., within region 96 of FIG. 4). This may allow a user to place different types of devices 24 over the same location on device 12 without sacrificing wireless charging efficiency, regardless of whether the device 24 includes horizontal coils 48B or vertical coils 48A. This may, for example, reduce the likelihood that the user will place device 24 over an inappropriate location for the given type of device 24. At the same time, this also serves to minimize the amount of space required in device 10 to accommodate coils for wirelessly charging different types of devices. If desired, alignment structures on charging surface 82 may serve to guide or position device 24 over the location on charging surface 82 that optimizes wireless power transfer regardless of the type coil used on device 24 (e.g., because coils 42A, 42B-1, and 42B-2 each exhibit maximum wireless power transfer at the same location on charging surface 82).

Coil 42B-1, coil 42B-2, and the underlying coil 42A may sometimes be referred to herein as unit cell 102. Device 12 may include only a single unit cell 102 at charging surface 82 or may include multiple unit cells 102 at charging surface 82 (e.g., two unit cells 102, three unit cells 102, or more than three unit cells 102). In scenarios where device 10 includes multiple unit cells 102, the unit cells can be arranged in an array or grid having rows and columns or in any other desired pattern (e.g., hexagonal patterns or other patterns that do not include rows and columns). In these scenarios, different unit cells 102 can be used to concurrently charge multiple different devices 24 placed on charging surface 82.

Figure 5:
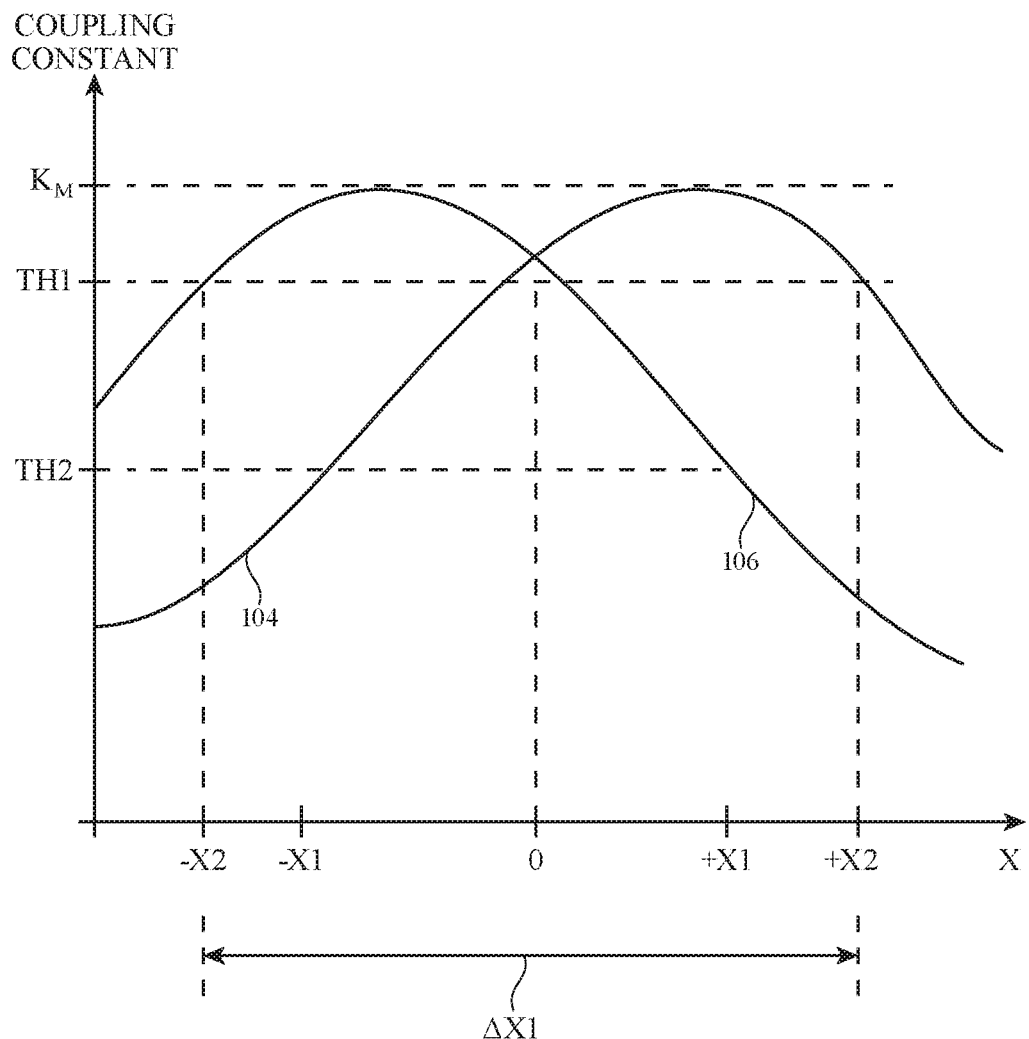
FIG. 5 is a plot in which wireless charging performance (coupling constant) has been plotted as a function of distance across a wireless power transmitting device of the type shown in FIG. 4 in accordance with an embodiment.

The wireless charging efficiency of device 24 is determined in part by the coupling constant between coils 42 on device 12 and coil 48 on device 24. FIG. 5 is an illustrative plot of coupling constant between rectangular coils 42B-1 and 42B-2 and horizontal coil 48B on device 24 as a function of position along the X-axis of FIG. 4. The X=0 position of FIG. 5 corresponds to the location of the central axis of coil 42A (e.g., a location half-way between the right-most vertical segment 90 of coil 42B-1 and the left-most vertical segment 90 of coil 42B-2).

As shown in FIG. 5, curve 104 plots the coupling constant between coil 42B-2 and horizontal coil 48B as horizontal coil 48B is moved along the X-axis of FIG. 4. Curve 104 exhibits a peak magnitude $K_M$ at the location along the X-axis of the left-most vertical segment 90 of coil 42B-2. At this location, horizontal coil 48B is located directly over the left-most vertical segment 90 of coil 42B-2 and generates current in response to horizontal component 93 of the magnetic field generated by that vertical segment 90.

Curve 106 plots the coupling constant between coil 42B-1 and horizontal coil 48B as horizontal coil 48B is moved along the X-axis of FIG. 4. Curve 106 exhibits a peak magnitude $K_M$ at the location along the X-axis of the right-most vertical segment 90 of coil 42B-1. At this location, horizontal coil 48B is located directly over this right-most vertical segment 90 of coil 42B-1 and generates current in response to horizontal component 93 of the magnetic field generated by that vertical segment 90.

Curves 104 and 106 have magnitudes greater than threshold level TH1 for positions between X=−X2 and X=+X2. Threshold level TH1 may be a minimum coupling constant for which device 24 exhibits a sufficient wireless charging efficiency while being charged using only one of coils 42B-1 and 42B-2. Threshold level TH1 may be between 0.10 and 0.18, between 0.11 and 0.13, greater than 0.1, greater than 0.18, approximately 0.12, or another threshold level, as examples. By forming both coils 42B-1 and 42B-2 over coil 42A, unit cell 102 can exhibit a satisfactory coupling constant greater than threshold level TH1 even as horizontal coil 48B is moved along the X-axis of FIG. 4.

For example, one of coils 42B-1 and 42B-2 can be active at a given time such that a satisfactory coupling constant is achieved if horizontal coil 48B is placed at any desired location between X=−X2 and X=X2. In other words, device 12 can exhibit a lateral area ΔX over which device 24 can be charged using horizontal coil 48B with sufficient wireless charging efficiency. In one arrangement, lateral area ΔX corresponds to region 96 of FIG. 4. Lateral area ΔX is larger than the lateral area that would be available in scenarios where unit cell 102 includes only a single coil for charging horizontal coil 48B (e.g., the arrangement of FIG. 4 allows for more positional freedom along the X-axis than in scenarios where only a single coil is used). In scenarios where both coils 42B-1 and 42B-2 are active at a given time, the coupling constant for each coil need only be greater than a lower threshold value TH2 (e.g., because both coils will contribute to the magnetic field used to charge device 24).

The examples of FIGS. 4 and 5 are merely illustrative. In practice, curves 104 and 106 can have other shapes. Coils 42B-1 and 42B-2 can have other shapes (e.g., hexagonal shapes, "D" shapes having straight and curved segments, square shapes, or other shapes), so long as coils 42B-1 and 42B-2 each include straight segments that overlap central region 91 and that extend parallel to the Y-axis of FIG. 4 (e.g., segments such as vertical segments 90 of FIG. 4). The presence of vertical segments 90 in coils 42B-1 and 42B-2 allows for wireless charging of horizontal coil 48B in addition to the wireless charging capabilities provided for vertical coils 48A by coil 42A. Coil 42A can have other shapes if desired (e.g., a hexagonal shape, a "D" shape, a square shape, a rectangular shape, an elliptical shape, etc.).

Figure 6:
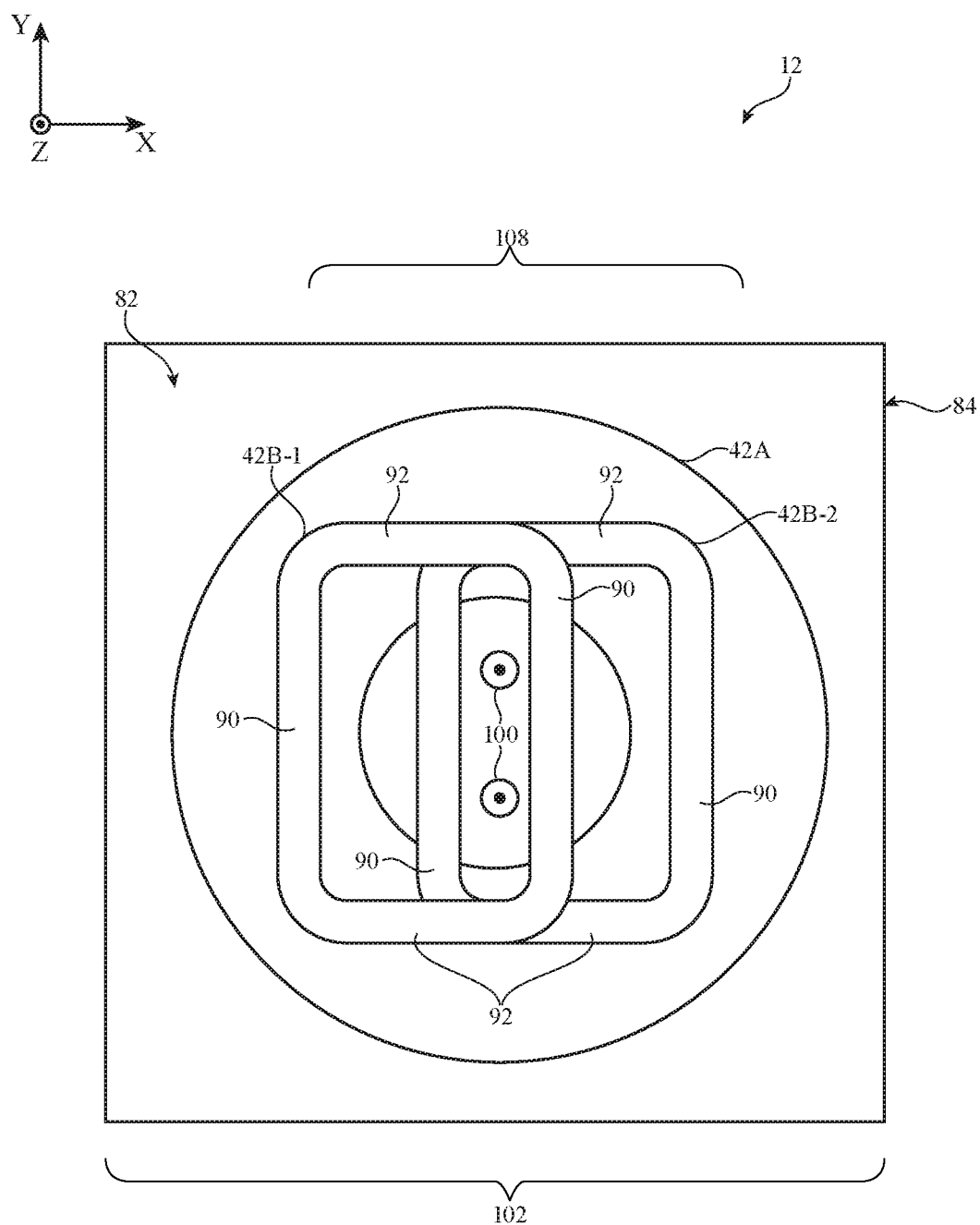
FIG. 6 is a top view of an illustrative wireless power transmitting device having multiple overlapping coils for charging the same type of wireless power receiving coils in accordance with an embodiment.

In one illustrative arrangement, coil 42B-1 overlaps coil 42B-2 in unit cell 102. FIG. 6 is a top-down view of device 12 showing how coil 42B-1 can overlap coil 42B-2. As shown in FIG. 6, coil 42B-1 overlaps a portion of coil 42B-2 (e.g., a portion of coil 42B-2 is interposed between a portion of coil 42B-1 and coil 42A). This is merely illustrative and, if desired, coil 42B-2 can overlap a portion of coil 42B-1.

In the example of FIG. 6, the right-most vertical segment 90 of coil 42B-1 is laterally located (interposed) between the left-most vertical segment 90 of coil 42B-2 and the right-most vertical segment 90 of coil 42B-2. Similarly, the left-most vertical segment 90 of coil 42B-2 is laterally located between the left-most vertical segment 90 of coil 42B-1 and the right-most vertical segment 90 of coil 42B-1. Using overlapping coils 42B can adjust the coupling constant and positional freedom along the X-axis as well as the overall footprint of unit cell 102 relative to scenarios where coils 42B do not overlap (e.g., as shown in FIG. 4).

Figure 7:
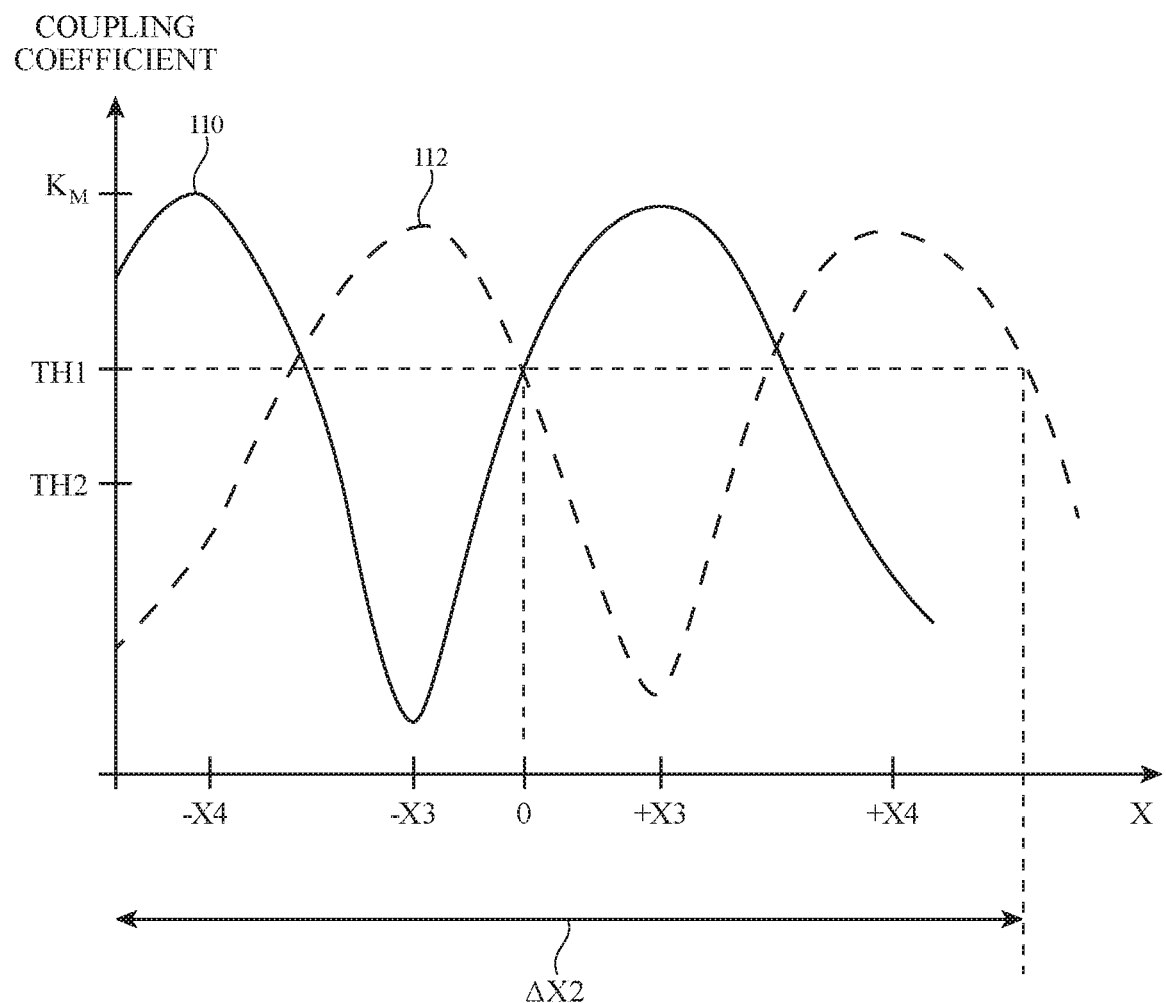
FIG. 7 is a plot in which wireless charging performance (coupling constant) has been plotted as a function of distance across a wireless power transmitting device of the type shown in FIG. 6 in accordance with an embodiment.

FIG. 7 is an illustrative plot of coupling constant between rectangular coils 42B-1 and 42B-2 and horizontal coil 48B on device 24 as a function of position along the X-axis of FIG. 6 (e.g., in scenarios where coils 42B-1 and 42B-2 are overlapping). As shown in FIG. 7, dashed curve 112 plots the coupling constant between coil 42B-2 and horizontal coil 48B as horizontal coil 48B is moved along the X-axis of FIG. 6. Curve 112 exhibits peak magnitude $K_M$ at the locations along the X-axis of each vertical segment 90 of coil 42B-2 (e.g., at X=−X3 and X=X4).

Curve 110 of FIG. 7 plots the coupling constant between coil 42B-1 and horizontal coil 48B as horizontal coil 48B is moved along the X-axis of FIG. 6. Curve 110 exhibits peak magnitude $K_M$ at the locations along the X-axis of each vertical segment 90 of coil 42B-1 (e.g., at X=−X4 and X=X3). Curves 110 and 112 collectively exhibit magnitudes greater than threshold level TH1 for any position across lateral area ΔX2. One or both of coils 42B-1 and 42B-2 may be activated at a given time to ensure that a coupling constant greater than threshold level TH1 is achieved regardless of where horizontal coil 48B of device 24 is located within lateral area ΔX2.

Lateral area ΔX2 can be greater than, less than, or equal to lateral area ΔX1 of FIG. 5. Lateral area ΔX2 is larger than the lateral area that would be available in scenarios where unit cell 102 includes only a single coil for charging horizontal coil 48B (e.g., the arrangement of FIG. 6 allows for more positional freedom along the X-axis than in scenarios where only a single coil is used). In scenarios where both coils 42B-1 and 42B-2 are active at a given time, the coupling constant for each coil need only be greater than a lower threshold value TH2 (e.g., because both coils will contribute to the magnetic field used to charge device 24).

The examples of FIGS. 6 and 7 are merely illustrative. In practice, curves 110 and 112 can have other shapes. Coils 42B-1 and 42B-2 can have other shapes (e.g., hexagonal shapes, "D" shapes having straight and curved sides, square shapes, or other shapes) while still having portions that overlap each other. Any desired number of unit cells 102 of the type shown in FIG. 4 and/or FIG. 6 can be arranged across charging surface 82 of device 12.

Figure 8:
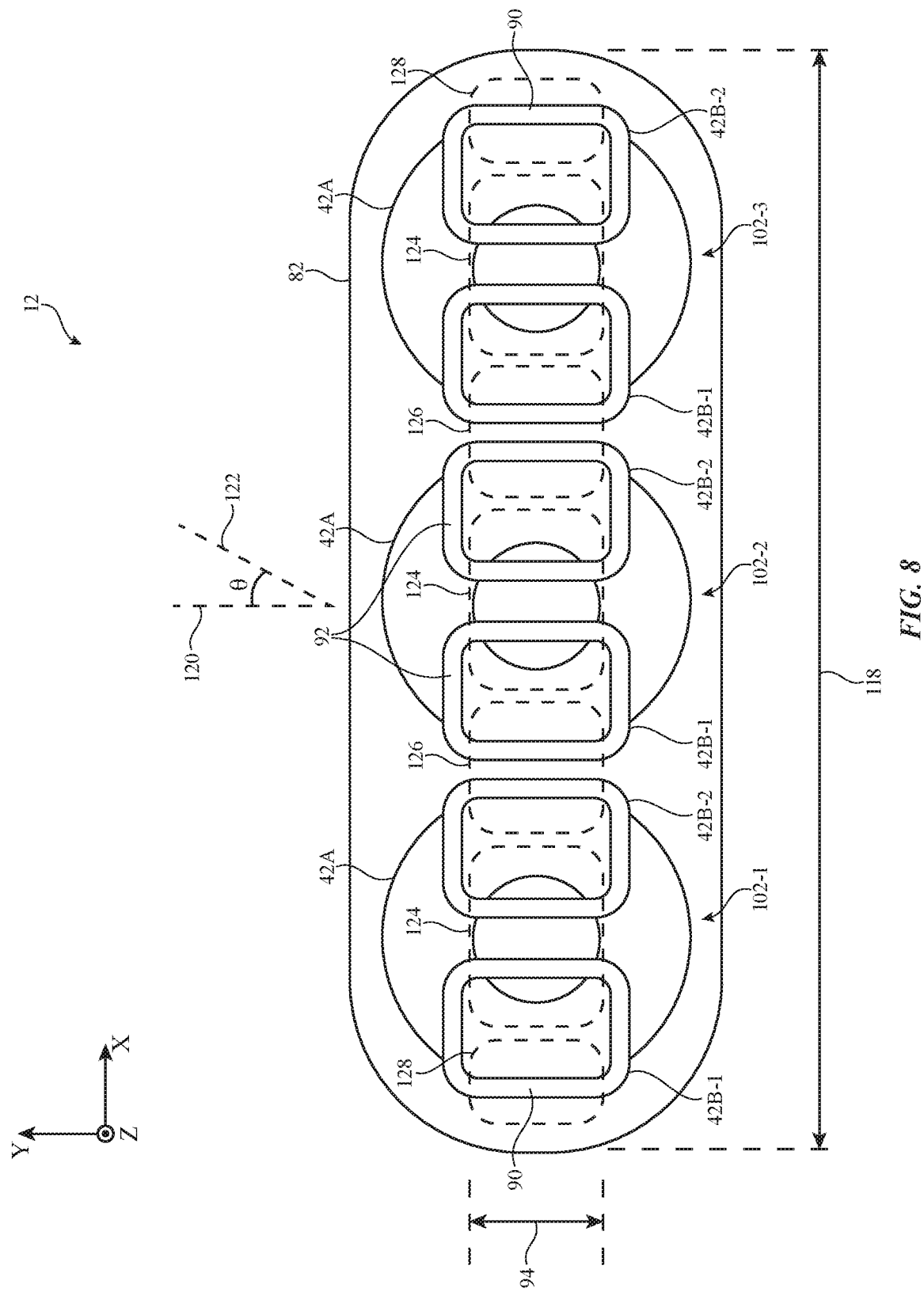
FIG. 8 is a top view of an illustrative wireless power transmitting device having multiple unit cells of overlapping coils for charging multiple wireless power receiving devices in accordance with an embodiment.

FIG. 8 is a top-down view showing how device 12 can include three unit cells 102 arranged across charging surface 82. In the example of FIG. 8, device 12 includes a first unit cell 102 such as unit cell 102-1, a second unit cell 102 such as unit cell 102-2, and a third unit cell 102 such as unit cell 102-3 arranged in a single row (e.g., along a longitudinal axis of device 12 parallel to the X-axis of FIG. 8). This is merely illustrative and unit cells 102 can be arranged in any desired pattern (e.g., a triangular pattern or other patterns). Each unit cell 102 includes an underlying coil 42A and overlying coils 42B-1 and 42B-2. If desired, one or more (e.g., all) of unit cells 102 can include overlapping coils 42B-1 and 42B-2 (e.g., as shown in FIG. 6).

Devices 24 having vertical coils 48A can be placed over the center of coils 42A in unit cells 102-1, 102-2, and/or 102-3 for receiving wireless power from coils 42A. If desired, alignment structures can be formed on one or more of unit cells 102-1, 102-2, and 102-3 to help guide a user to place device 24 at a location on charging surface 82 that optimizes coupling coefficient with coils 42A (e.g., over the center of coils 42A).

Devices 24 having horizontal coils 48B can be placed over the center of coils 42A (e.g., within central charging regions 124) in unit cells 102-1, 102-2, and/or 102-3 for receiving wireless power from coils 42B-1 and/or 42B-2. When device 24 is placed over a central charging region 124, magnetic fields generated by the right-most vertical segment 90 of coil 42B-1 and/or the left-most vertical segment 90 of coil 42B-2 in that unit cell 102 are used to transfer wireless power to horizontal coil 48B.

If desired, the same alignment structures that are used to help guide a user to place device 24 at a location on charging surface 82 that optimizes coupling coefficient with coils 42A can be used to help guide the user to place device 24 at a location that optimizes coupling coefficient with coils 42B-1 and 42B-2 (e.g., because central charging regions 124 overlap the center of the underlying coils 42A).

When configured in this way, device 12 allows for positional tolerance in the placement of devices 24 across charging surface 82. For example, device 24 can be placed at any desired location on charging surface 82 such that horizontal coil 48B is located within a corresponding central charging region 124 (e.g., device 24 need not be placed precisely over the center of coil 42A or location X=0 of FIGS. 5 and 7).

The arrangement of FIG. 8 allows for further positional tolerance along the X-axis of device 12. For example, devices 24 having horizontal coils 48B can also be placed over regions 126 between adjacent unit cells 102 (sometimes referred to herein as inter-cell regions 126). When device 24 is placed over an inter-cell region 126, magnetic fields generated by the right-most vertical segment 90 of coil 42B-2 and/or the left-most vertical segment 90 of coil 42B-1 in the adjacent unit cell 102 can be used to transfer wireless power to horizontal coil 48B. Devices 24 can also be placed over regions 128 at the ends of charging surface 82. When device 24 is placed over regions 128, magnetic fields generated by the one vertical segment 90 from unit cells 102 can be used to transfer wireless power to horizontal coil 48B.

In this way, regions 128, 124, and 126 can each be used to provide wireless power to devices 24 having horizontal coils 48B (e.g., using coils 42B-1 and 42B-2), whereas regions 124 can be used to provide wireless power to devices 24 having vertical coils 48A (e.g., using coils 42A). In the example of FIG. 8, regions 128, 124, and 126 are continuous such that devices 24 having horizontal coils 48B can be placed at any desired location along the width of charging surface 82 (e.g., where horizontal coil 48B overlaps the region defined by dimensions 118 and 94).

In this way, the same locations on charging surface 82 (e.g., regions 126) can be used to charge different types of devices 24 regardless of whether device 24 includes a horizontal coil 48B or a vertical coil 48A. For example, the user need not keep track of the precise location across charging surface 82 that is used to charge each type of device and the user need not precisely place devices 24 having horizontal coils 48B on charging surface 82. If desired, different unit cells 102 can be used to concurrently charge multiple different devices 24 at once, regardless of whether the devices 24 have vertical coils 48A or horizontal coils 48B. For example, unit cell 102-1 can wirelessly charge a first device 24 having a horizontal coil 48B (e.g., using horizontal components of the magnetic field generated by coils 42B-1 and/or 42B-2 within a corresponding region 128, 126, or 124) while unit cell 102-2 wirelessly charges a second device 24 having a vertical coil 48A (e.g., using vertical components of the magnetic field generated by coil 42A within the corresponding region 124) and unit cell 102-3 wirelessly charges a third device having a horizontal coil 48B.

Control circuitry 16 can identify a location of device 24 (coil 48) over charging surface 82 and/or the type or orientation of coil 48 over charging surface 82 and can activate selected sets of antennas 42 accordingly. For example, if control circuitry 16 identifies that a vertical coil 48A is located within a given region 124, control circuitry 16 activates the coil 42A within that unit cell 102 to transmit wireless power to device 24. If control circuitry 16 identifies that a horizontal coil 48B is located within region 124, control circuitry 16 activates one or both of coils 42B-1 and 42B-2 in that unit cell 102 to transmit wireless power to device 24. If control circuitry 16 identifies that a horizontal coil 48B is located within region 126, control circuitry 16 activates one or both of coils 42B-1 and 42B-2 in adjacent unit cells 102 to transmit power to device 24.

The example of FIG. 8 is merely illustrative. Charging surface 82 may include any desired number of unit cells 102 arranged in any desired pattern. Device 12 can have any desired shape (e.g., shapes having curved and/or straight edges).

An arrangement of the type shown in FIG. 8 also allows for rotational tolerance in the placement of devices 24 on charging surface 82. For example, devices 24 having vertical coils 48A can be placed at any desired angle θ with respect to axis 120 of FIG. 8 while exhibiting sufficient wireless charging efficiency (e.g., so long as surface 74 of FIG. 3 is placed on charging surface 82).

Ideally, devices 24 having horizontal coils 48B should be oriented such that central axis 70 of horizontal coil 48B (FIG. 3) is aligned with the X-axis of FIG. 8 (e.g., such that transverse axis 80 of FIG. 3 is parallel to axis 120 and the Y-axis of FIG. 8). This alignment maximizes coupling between the horizontal component of the magnetic field generated by vertical segments 90 and horizontal coil 48B.

However, the presence of adjacent coils 42B across charging surface 82 also allows devices 24 having horizontal coils 48B to be rotated across a range of other angles while still exhibiting a sufficiently high coupling constant and thus sufficient wireless charging efficiency. For example, device 24 can be placed on charging surface 82 such that transverse axis 80 (FIG. 3) is oriented parallel to axis 122 (e.g., at angle θ with respect to axis 120).

Figure 9:
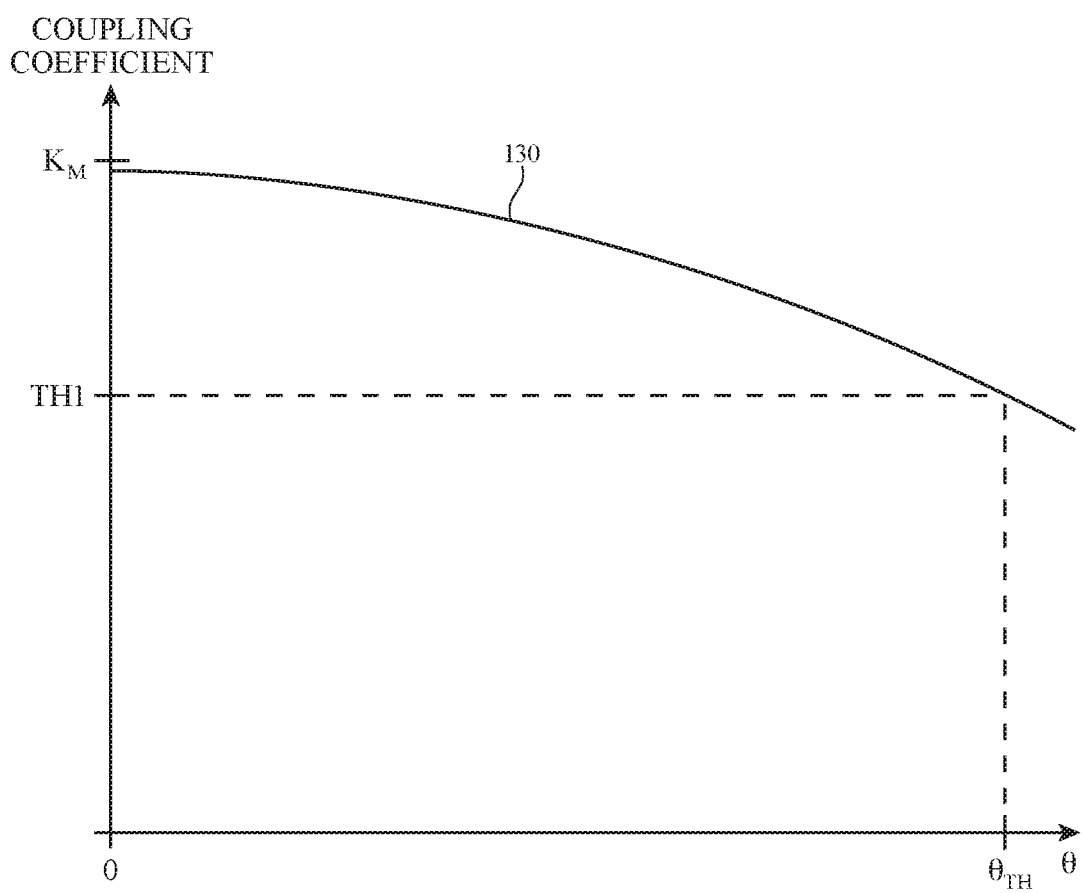
FIG. 9 is a plot in which wireless charging performance (coupling constant) has been plotted as a function of rotational angle for a wireless power receiving device with respect to a wireless power transmitting device of the types shown in FIGS. 4, 6, and 8 in accordance with an embodiment.

FIG. 9 is an illustrative plot of coupling constant between rectangular coils 42B-1 and 42B-2 and horizontal coil 48B on device 24 as a function of the angle θ between transverse axis 80 (FIG. 3) and axis 120 (FIG. 8). As shown in FIG. 9, curve 130 plots the coupling constant between coils 42B-1 and/or 42B-2 and horizontal coil 48B as horizontal coil 48B (device 24) is rotated about the Z-axis of FIG. 8 (e.g., from a fixed location such as X=X3 of FIG. 7).

Curve 130 exhibits peak magnitude $K_M$ when angle θ=0 degrees because central axis 70 of horizontal coil 48B is aligned with the horizontal component of the magnetic field produced by coils 42B-1 and/or 42B-2. As horizontal coil 48B is rotated and angle θ increases, the coupling constant decreases because central axis 70 becomes misaligned with the horizontal component of the magnetic field. When horizontal coil 48B is rotated to a maximum angle $θ_{TH}$, the coupling constant reaches minimum threshold value TH1. At greater angles, the coupling constant drops below a level required to obtain sufficient wireless charging efficiency. By arranging coils 42 on device 12 as shown in the examples of FIGS. 4, 6, and 8, maximum angle $θ_{TH}$ may be relatively large. For example, maximum angle $θ_{TH}$ can be between 20 degrees and 35 degrees, between 15 degrees and 40 degrees, between 30 degrees and 40 degrees, between 20 degrees and 30 degrees, or less than 20 degrees. In one particular arrangement, maximum angle $θ_{TH}$ is approximately 25 degrees. In this way, a user need not focus on placing devices 24 on charging surface 82 with a precise orientation, regardless of whether device 24 has horizontal coils 48B or vertical coils 48A.

Control circuitry 16 on device 12 (FIG. 1) can use measurement circuitry 41 to gather measurements such as voltage and/or impedance measurements from each of the coils 42 in device 12. Different measurements are associated with different types of environments over coils 42. For example, measurement circuitry 41 may gather first measurement values in the presence of horizontal coils 48B over coils 42, second measurement values in the presence of vertical coils 48A over coils 42, third measurement values in the absence of material over coils 42, etc. Control circuitry 16 can use these measurements to determine whether to activate or deactivate each coil 42 across charging surface 82 in real time.

For example, control circuitry 16 can store predetermined or calibrated measurements associated with different types of environments over coils 42 (e.g., first set of predetermined measurements associated with the presence of horizontal coil 48B over coil 42, a second set of predetermined measurements associated with the presence of vertical coil 48A, a third set of predetermined measurements associated with free space, a fourth set of predetermined measurements associated with a foreign object, etc.). Control circuitry 16 compares measurements gathered using measurement circuitry 41 to the stored measurements to identify the presence, type of material, or type (orientation) of coil 48 located over each coil 42. If desired, control circuitry 16 can also use in-band communications to help identify the type of device 24 (e.g., the type or orientation of coil 48) that is present over a given coil 42 (e.g., by transmitting and/or receiving in-band signals using that coil 42). Control circuitry 16 can activate one or both coils 42B in a given unit cell 102 in response to determining that a horizontal coil 48B is located over that unit cell and may activate coil 42A in response to determining that a vertical coil 48A is located over that unit cell.

Control circuitry 16 can gather these measurements sequentially and/or in parallel for each coil 42 across charging surface 82. Control circuitry 16 can identify changes in the measurements over time to identify when device 24 has moved away from coils 42 (e.g., when a user has removed device 24 from charging surface 82) and may take appropriate action in response to such an identification (e.g., control circuitry 16 can disable coils 42 in response to determining that no coils 48 are present over coils 42). In this way, control circuitry 16 can control device 12 to selectively charge one or more devices 24 as the devices are placed onto or moved across charging surface 82 over time, regardless of whether the devices include horizontal coils 48B, vertical coils 48A, or no coils 48. If desired, one or more dedicated coils 42 on device 12 can be used solely for detecting the presence and type of objects placed on charging surface 82 (e.g., without wirelessly charging any devices 24).

The foregoing is merely illustrative and various modifications can be made to the described embodiments. The foregoing embodiments may be implemented individually or in any combination.

What is claimed is:

1. A wireless power transmitting device comprising:
a first wireless power transmitting coil that includes conductive loops surrounding a central region;
a second wireless power transmitting coil that is smaller than the first wireless power transmitting coil and that includes a first straight segment that overlaps the central region;
a third wireless power transmitting coil that is smaller than the first wireless power transmitting coil and that includes a second straight segment that overlaps the central region and extends parallel to the first straight segment; and
control circuitry configured to transmit wireless power through a charging surface to a first type of electronic device using the first wireless power transmitting coil and to a second type of electronic device different than the first type of electronic device using the second and third wireless power transmitting coils.

2. The wireless power transmitting device defined in claim 1, wherein the conductive loops in the first wireless power transmitting coil comprise circular conductive loops.

3. The wireless power transmitting device defined in claim 2, wherein the second wireless power transmitting coil comprises first rectangular conductive loops and the third wireless power transmitting coil comprises second rectangular conductive loops.

4. The wireless power transmitting device defined in claim 3, wherein the circular conductive loops wind around the central region from an inner diameter to an outer diameter, the first and second rectangular conductive loops each having a length and a width that is less than the outer diameter.

5. The wireless power transmitting device defined in claim 4, wherein the length is less than the width, the first straight segment extends across the length of the first rectangular conductive loops, and the second straight segment extends across the length of the second rectangular conductive loops.

6. The wireless power transmitting device defined in claim 5, wherein the inner diameter is between 10 mm and 30 mm and the outer diameter is between 30 mm and 70 mm.

7. The wireless power transmitting device defined in claim 1, wherein the first wireless power transmitting coil comprises a first number of conductive loops and the second and third wireless power transmitting coils each comprise a second number of conductive loops that is less than the first number of conductive loops.

8. The wireless power transmitting device defined in claim 1, wherein the second wireless power transmitting coil overlaps a portion of the third wireless power transmitting coil.

9. The wireless power transmitting device defined in claim 8, wherein the second wireless power transmitting coil comprises a third straight segment extending parallel to the first and second straight segments and the third wireless power transmitting coil comprises a fourth straight segment extending parallel to the third straight segment, wherein the second straight segment is laterally interposed between the third and first straight segments, and wherein the first straight segment is laterally interposed between the second and fourth straight segments.

10. The wireless power transmitting device defined in claim 1, wherein the second wireless power transmitting coil comprises a third straight segment extending parallel to the first and second straight segments and the third wireless power transmitting coil comprises a fourth straight segment extending parallel to the third straight segment, wherein the second straight segment is laterally interposed between the fourth and first straight segments, and wherein the first straight segment is laterally interposed between the second and third straight segments.

11. The wireless power transmitting device defined in claim 1, further comprising:
a first inverter coupled to the second wireless power transmitting coil; and
a second inverter coupled to the third wireless power transmitting coil, wherein the control circuitry is configured to transmit the wireless power by controlling the first inverter to drive a first current on the second wireless power transmitting coil and by controlling the second inverter to concurrently drive a second current on the third wireless power transmitting coil that is out of phase with respect to the first current on the second wireless power transmitting coil.

12. The wireless power transmitting device defined in claim 1 further comprising a layer, wherein the first wireless power transmitting coil is interposed between the layer and the second and third wireless power transmitting coils, and the layer comprises a material selected from the group consisting of: ferrite and a nano-crystalline material.

13. The wireless power transmitting device defined in claim 1, further comprising:
a fourth wireless power transmitting coil that includes additional conductive loops surrounding an additional central region;
a fifth wireless power transmitting coil that is smaller than the first and fourth wireless power transmitting coils and that includes a third straight segment that overlaps the additional central region and that extends parallel to the first and second straight segments; and
a sixth wireless power transmitting coil that is smaller than the first and fourth wireless power transmitting coils and that includes a fourth straight segment that overlaps the additional central region and extends parallel to the third straight segment, wherein the control circuitry is control circuitry configured to transmit the wireless power through the charging surface using the fourth, fifth, and sixth wireless power transmitting coils.

14. The wireless power transmitting device defined in claim 1, wherein the first type of electronic device comprises a cellular telephone and wherein the second type of electronic device comprises a wristwatch with a wrist strap.

15. The wireless power transmitting device defined in claim 1, wherein the first type of electronic device comprises a cellular telephone having a vertical coil and wherein the second type of electronic device comprises a wristwatch having a horizontal coil.

16. A wireless charging mat comprising:
a charging surface;
at least one unit cell of wireless power transmitting coils, wherein each unit cell in the at least one unit cell comprises:
a circular coil that extends across a first lateral area of the charging surface and that is optimized to transmit wireless power to a first type of electronic device,
a first rectangular coil that at least partially overlaps the circular coil, wherein the first rectangular coil comprises a first straight segment and a second straight segment extending parallel to the first straight segment, and a second rectangular coil that at least partially overlaps the circular coil, wherein the second rectangular coil comprises a third straight segment that extends parallel to the second straight segment and a fourth straight segment that extends parallel to the third straight segment, wherein the first and second rectangular coils each extend across a second lateral area of the charging surface that is smaller than the first lateral area, and wherein the first and second rectangular coils are optimized to transmit wireless power to a second type of electronic device different than the first type of electronic device; and control circuitry configured to transmit wireless power through the charging surface using the at least one unit cell.

17. The wireless charging mat defined in claim 16, wherein the circular coil comprises loops of conductor that surround a central region devoid of conductive material and the second and third straight segments each overlap the central region.

18. The wireless charging mat defined in claim 17, wherein the first rectangular coil comprises fifth and sixth straight segments extending between the first and second straight segments, the second rectangular coil comprises seventh and eighth straight segments extending between the third and fourth straight segments, the first, second, third, and fourth straights segments each have a first length, and the fifth, sixth, seventh, and eighth straight segments each have a second length that is less than the first length.

19. The wireless charging mat defined in claim 17, wherein the at least one unit cell comprises first, second, and third unit cells arranged in a row along a longitudinal axis of the wireless charging mat, and wherein the first, second, third, and fourth straight segments each extend perpendicular to the longitudinal axis of the wireless charging mat.

20. The wireless charging mat defined in claim 16, wherein the control circuitry is configured to:
  identify an orientation of a wireless power receiving coil in the first or second type of electronic device;
  activate at least one of the first and second rectangular coils in at least one of the unit cells in response to identifying that the wireless power receiving coil is in a first orientation; and
  activate the circular coil in at least one of the unit cells in response to identifying that the wireless power receiving coil is in a second orientation that is different from the first orientation.

21. The wireless charging mat defined in claim 20, further comprising measurement circuitry, wherein the control circuitry is further configured to identify the orientation of the wireless power receiving coil based on data, and wherein the data comprises data selected from the group consisting of: wireless data from an in-band signal received by at least one of the unit cells from the wireless power receiving coil, and voltage data measured from at least one of the unit cells using the measurement circuitry.

22. A wireless power transmitting device configured to transmit wireless power to a wireless power receiving coil in a wireless power receiving device on a charging surface of the wireless power transmitting device, the wireless power transmitting device comprising:
  a first circular coil;
  a second circular coil;
  a first pair of rectangular coils overlapping the first circular coil;
  a second pair of rectangular coils overlapping the second circular coil; and
  control circuitry, wherein the control circuitry is configured to:
    identify a location of the wireless power receiving coil on the charging surface;
    transmit the wireless power through the charging surface using a selected one of the first circular coil and the first pair of rectangular coils in response to identifying that the wireless power receiving coil overlaps the first circular coil,
  transmit the wireless power through the charging surface using a selected one of the second circular coil and the second pair of rectangular coils in response to identifying that the wireless power receiving coil overlaps the second circular coil, and
  transmit the wireless power through the charging surface using one rectangular coil from each of the first and second pairs of rectangular coils in response to identifying that the wireless power receiving coil overlaps a location on the charging surface between the first and second circular coils.

* * * * *